2,855,313

PROCESS FOR IMPROVING THE AROMA AND STABILIZING UNGROUND ROASTED COFFEE BEANS

Hans Walter Bach, Wiesbaden, Germany

No Drawing. Application March 7, 1957
Serial No. 644,449

Claims priority, application Germany March 7, 1956

1 Claim. (Cl. 99—152)

The present invention relates to an improved process for improving the aroma characteristics of and for stabilizing unground roasted coffee beans.

The staling of roasted coffee is of considerable economic importance, especially to coffee dealers, restaurants with varying demand and households. Consequently, airtight packings have been employed to retard staling, but only with limited success, as oxygen containing air remains between the coffee beans. It is also known that roasted coffee is rather hygroscopic and that it can take up 6.4% of moisture at a relative atmospheric humidity of 50%. This exceeds the 5% tolerance limit according to the German food laws. The grinding properties, as well as the aroma of roasted coffee, suffer considerably from such absorption of moisture. Furthermore, most coffee beans which are roasted with flame gases are bathed in the combustion gases and as a consequence take up a part of the deleterious combustion gases, especially $H_2S$. Such adhering gases cannot be completely removed by an airing lasting 8–10 hours and more.

It is the object of the present invention to provide a process whereby roasted coffee beans are freed of adhering foreign gases and air and whereby access of atmospheric oxygen and water vapor is prevented even when the coffee is stored in ordinary bags or containers.

According to the invention it was found that this object could be achieved by placing the roasted coffee beans in a container and spraying them from below with liquid carbon dioxide so that the coffee beans are whirled around in said vessel similarly to a fluidized bed by such liquid carbon dioxide and the gaseous carbon dioxide evaporating therefrom and shock cooled thereby. The whirling of the coffee beans achieved with the carbon dioxide blows off the adhering foreign gaseous components. Furthermore, the cold shock received by the coffee beans closes the pores of the coffee beans so that they retain their aroma and the take up of moisture during subsequent storage is prevented.

The nozzle for supplying the liquid carbon dioxide spray is preferably located at the bottom of the treating vessel and the liquid carbon dioxide is supplied to such nozzle from a liquid carbon dioxide tank under pressure. It was found that the usual reduction valves for carbon dioxide tanks do not suffice for the purposes of the invention, as they tend to clog and then do not supply the carbon dioxide properly. Consequently, according to the invention the carbon dioxide tank valve is fully opened so that the liquid carbon dioxide flows through such valve and through the conduit to the outlet nozzle in the treating vessel without loss of pressure and temperature. The process according to the invention utilizes the kinetic energy of the liquid carbon dioxide for effecting the whirling around of the coffee beans during the treatment. The treating vessel, of course, is maintained below the critical temperature and pressure of the liquid carbon dioxide so that the liquid carbon dioxide can evaporate to exert the necessary quick cooling effect. For instance, the upper portion of the treating vessel can have access to the atmosphere so that approximately atmospheric pressure prevails in the vessel.

The following example will serve to illustrate the process according to the invention:

*Example*

500 grams of roasted coffee beans were placed in an upright conically shaped vessel provided with an inlet nozzle for liquid carbon dioxide at its lower narrow end and a gas permeable cloth covering at its upper end to permit escape of developed carbon dioxide while preventing possible expulsion of coffee beans during the treatment. Liquid carbon dioxide was then sprayed upwardly through the coffee beans for a few seconds to whirl them around in the vessel and shock cool them. The short treatment served to reduce the temperature of the roasted coffee beans on an average to below $-20°$ C. The thus treated coffee beans were then removed from the treating vessel and the vessel was ready for treatment of a further charge. Measurement of the oxidation numbers of the thus treated coffee beans and taste tests indicated that the treatment stabilized them for a period of months and that an improvement in aroma had occurred.

It has already been proposed to cool off roasted coffee in refrigerators to temperatures ranging from $-12°$ to $-72°$ C., but such method does not provide for the intensive thorough cooling of the roasted coffee beans in as short a period of time as the process according to the invention. It has also been suggested that inert gases or solid carbon dioxide be employed in the grinding of roast coffee, but such procedures also did not effect an intensive and shock like cooling and impregnation of the coffee beans with carbon dioxide.

I claim:

A process for improving the aroma and stabilizing unground roasted coffee beans during storage which comprises impinging liquid carbon dioxide upwardly against unground roasted coffee beans at such a pressure that they are whirled around by said liquid carbon dioxide and the gaseous carbon dioxide evaporating therefrom and shock cooled thereby, and storing the thus treated coffee beans.

References Cited in the file of this patent

UNITED STATES PATENTS

| | | |
|---|---|---|
| 1,924,059 | Hoskins | Aug. 22, 1933 |
| 2,046,158 | Gore | June 30, 1936 |